C. GRUNBAUCH.
TOOL HOLDER.
APPLICATION FILED APR. 28, 1913. RENEWED FEB. 15, 1915.
1,154,010.  Patented Sept. 21, 1915.
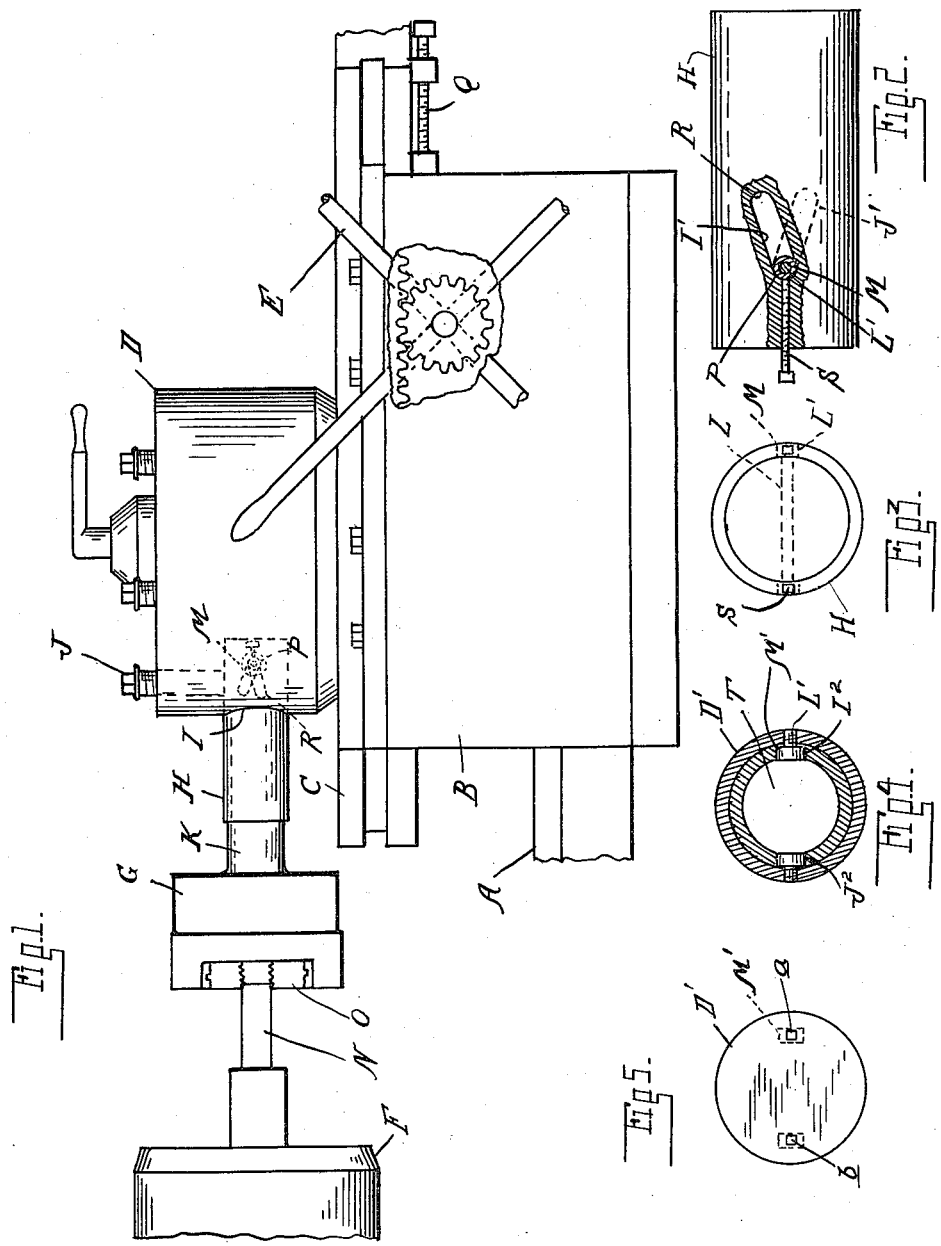
Witnesses
W. K. Ford
James P. Barry
Inventor
Charles Grunbauch
By (attorneys)

UNITED STATES PATENT OFFICE.

CHARLES GRUNBAUCH, OF DETROIT, MICHIGAN, ASSIGNOR OF ONE-HALF TO NELSON J. SEAVER, OF DETROIT, MICHIGAN.

TOOL-HOLDER.

1,154,010.

Specification of Letters Patent.

Patented Sept. 21, 1915.

Application filed April 28, 1913, Serial No. 764,106. Renewed February 15, 1915. Serial No. 8,291.

*To all whom it may concern:*

Be it known that I, CHARLES GRUNBAUCH, a citizen of the United States of America, residing at Detroit, in the county of Wayne and State of Michigan, have invented certain new and useful Improvements in Tool-Holders, of which the following is a specification, reference being had therein to the accompanying drawings.

My invention relates to tool holders and has among the objects thereof to provide a construction in which the die-head during the operation thereof upon the work, is permitted to feed forward independent of the turret or die-head support; to provide means for preventing binding of relatively movable parts during forward feeding of the die-head; and further to provide means for varying the forward travel of the die-head. Other objects of the invention will more fully hereinafter appear.

The invention consists in the peculiar construction, arrangement and combination of parts as will be hereinafter described and particularly pointed out in the claims.

In the drawings,—Figure 1 is a side elevation of a lathe embodying my invention; and Figs. 2 and 3 illustrate certain details of construction; and Figs. 4 and 5 illustrate a modification.

A designates the bed of the machine, upon which is mounted a movable carriage B, and C is a support or slide upon the carriage for the turret or die-head holder D, the slide C being fed to the desired position through the medium of hand levers E in the well-known manner.

F is the spindle of the machine, adapted to receive the work, and being driven in any suitable manner.

The parts so far described are of standard construction.

With one type of turret lathe now in general use the die-head is connected to the turret so that during the forward movement of the die-head upon the work the turret is pulled along by the die-head. Because of the weight of the turret it quite frequently happens—especially in turning threads upon members—that the threads will be damaged, due to the force required to pull the turret along. If an automatically releasing die-head is employed, if the pulling stress becomes too great the die-head will be partially opened, which will tend to strip or otherwise injure the threads. With another type of turret lathe in quite common use, during the cutting operation—such as threading—the turret is positively fed forward by suitable mechanism at a certain rate of speed. If the feeding of the turret is not properly timed the threads will be damaged, and considerable difficulty is quite frequently occasioned in obtaining an accurate feeding of the turret. Devices have been employed with lathes of the last-mentioned type to correct inaccuracies in the forward feeding of the turret, but they have not proven satisfactory where accurate threading or other cutting is required. To provide for an accurate feeding of the die-head in relation to the work, I so connect the die-head to the turret or other support that the head moves independently of the support during the working operation and is entirely free to feed forward properly.

In the drawings I have illustrated the invention as applied to a lathe for cutting threads upon rods, pipes or the like. Thus H is a sleeve fitting an aperture or opening I of the turret and clamped in place in the aperture through the medium of a set-screw J. This sleeve has arranged therein the shank K of the die-head, the latter being herein shown as of the automatically releasing type, the shank being free to move within certain limits longitudinally within the sleeve. Turning of the shank within the sleeve is prevented by means of a shaft L carried by the shank and having extensions L' arranged in longitudinal slots I' J' in the sleeve. Preferably the extensions L' are provided with rollers M.

With the parts so far described, assuming that a rod as N is to be threaded, the slide C is moved forwardly through the medium of the turnstile E until the dies O of the head G engage the free end of the member N. In this position the rollers M are at the rear ends P of the slots. Further forward movement of the slide in relation to this support B is prevented by means of an adjustable screw Q. The member D and sleeve H are therefore rigidly held against forward movement. Upon the spindle being rotated, the threaded dies will cause the head G to be drawn forward until the rollers M contact with the front ends R of the slots. This will arrest movement of the head G and permit the die to be automatically released in the usual manner. As the tendency of the head G during its forward movement is to rotate, if the slots in the sleeve were straight there would be considerable friction between the rollers and the sides of the slots, which would tend to retard the forward feeding of the head. To overcome this objection I have so arranged the slots that a slight rotary movement is permitted the head during the forward feeding thereof. Thus, one of the slots extends at an angle to the longitudinal axis of the sleeve, while the other slot extends at an angle in the opposite direction, the slots in effect forming a spiral guide for the rollers M. Thus it is necessary to hold the shank of the die-head against rotation sufficiently to permit the die to cut the work, but if the friction of the rollers in the slots is too great the resistance to the forward feeding would strip the threads. On the other hand, if the slots were pitched too much, there would be a tendency to crowd the die-head forward. This would make an imperfect thread. It is desirable, therefore, to so pitch the slots that while sufficient resistance will be offered to the turning of the die-head to effect the cutting of the threads, nevertheless substantially no resistance is offered to the forward feeding of the die-head. The resistance between the slots and rollers, as far as the forward feeding of the die-head is concerned, approximates the angle of friction. It will also be noted that the shank K and the member H are entirely free, except for the pin and slot connection.

The length of the thread may be varied by regulating the operative length of the slots I' J'. This may be accomplished in any suitable manner but preferably a set-screw S is arranged at the rear end of each slot and has the forward end thereof extending within the slot. By adjusting these screws the operative relation of the slots may be varied.

In die-heads in which the work to be threaded projects through the head, the shank T is made hollow and provided with slots I² J², and the rollers M' are carried by stub shafts L' upon the sleeve D'. The rear end of the shank however, is solid and set-screws *a b* are carried thereby and have their forward ends extending within the slots.

What I claim as my invention is:

1. The combination of a support held against rotary and longitudinal movement, telescoping members, one of said members being connected to said support against movement, a die-head carried by the other member, and a connection between said members permitting a free forward movement of the member carrying the die-head in a spiral path, the pitch of the spiral path being proportioned in accordance with the stresses transmitted to the die-head to cause the resistance to the forward feeding of the die-head to approximate the angle of friction, for the purpose described.

2. The combination of a support held against rotary and longitudinal movement, telescoping members, one of said members being connected to the support against movement, a die-head carried by the other member, and a connection between said members permitting a free forward movement of the member carrying the die-head in a spiral path, comprising a projection upon one of said members and a spiral guide upon the other member, the pitch of the spiral guide being proportioned in accordance with the stresses transmitted to the die-head to cause the resistance to the forward feeding of the die-head to approximate the angle of friction, whereby binding of the projection in the spiral guide is prevented during the working operation.

3. In a lathe, the combination with a turret held against longitudinal travel, a sleeve secured to said turret against longitudinal and rotary movement, a die-head having a shank engaging said sleeve, and a connection between said shank and sleeve permitting a free longitudinal travel of the shank within the sleeve in a spiral path, comprising diametrically opposed rollers upon the one, there being spiral slots in the other within which said rollers are arranged, the pitch of the slots being proportioned in accordance with the stresses transmitted to the die-head to cause the resistance to the forward feeding of the die-head to approximate the angle of friction, thereby avoiding binding of the rollers within the slots during the working operation.

In testimony whereof I affix my signature in presence of two witnesses.

CHARLES GRUNBAUCH.

Witnesses:
NELSON J. SEAVER,
WM. J. BELKNAP.